Figure 1:
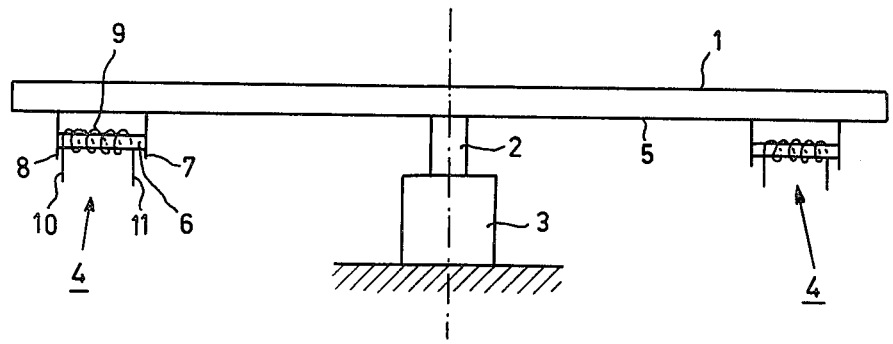

United States Patent [19]
Greve

[11] 3,947,625
[45] Mar. 30, 1976

[54] ELECTRICALLY CONTROLLED RADIAL MASS SHIFTING ELEMENTS FOR TURNTABLE SPEED REGULATION IN AN APPARATUS FOR READING DISC-SHAPED INFORMATION CARRIERS

[75] Inventor: Peter Ferdinand Greve, Eindhoven, Netherlands

[73] Assignee: U.S. Philips Corporation, New York, N.Y.

[22] Filed: Nov. 14, 1974

[21] Appl. No.: 523,714

[30] Foreign Application Priority Data
Sept. 13, 1974   Netherlands...................... 7412154

[52] U.S. Cl....... 178/6.6 DD; 178/6.6 P; 178/6.7 A; 179/100.1 S; 179/100.3 V; 179/100.4 E; 274/9 A; 360/73
[51] Int. Cl.² H04N 5/76; G11B 17/00; G11B 19/28
[58] Field of Search......... 178/6.6 R, 6.6 DD, 6.6 P, 178/6.7 A; 179/100.1 S, 100.4 E, 100.3 V; 274/9 A, 39 A; 360/73; 346/137; 358/8

[56] References Cited
UNITED STATES PATENTS

| | | | |
|---|---|---|---|
| 3,829,612 | 8/1975 | Beyers.......................... | 179/100.4 E |
| 3,873,764 | 3/1975 | Boltz, Jr........................ | 178/6.6 DD |
| 3,873,765 | 3/1975 | Schoop et al................. | 179/100.1 S |

*Primary Examiner*—Raymond F. Cardillo, Jr.
*Attorney, Agent, or Firm*—Frank R. Trifari; Simon L. Cohen

[57] ABSTRACT

An apparatus for reading disc-shaped information carriers which are provided with substantially circular tracks, in which information is stored in coded form, in particular picture information, which information carriers are disposed on a turntable, a read unit supplying a control signal to a control device for maintaining the reading speed constant.

The control device comprises at least two mass elements which are connected to the turntable symmetrically relative to the axis of rotation of the turntable, resiliently in the radial direction and rigidly in the tangential direction, which elements are radially movable in response to the control signal.

In one control device each element consists of an axially magnetized rod-shaped permanent magnet, which is attached to the turntable by at least one radially flexible leaf spring, a coil being disposed around each magnet, which coil is connected to the control signal.

In another control device each element is identically attached to the edge of a metal disc via a connecting rod, which disc is disposed centrally and loosely around the drive shaft of the turntable, at least one electro-magnet being disposed underneath the disc, which electro-magnet magnetically cooperates with the disc and is connected to the control signal.

The control signal is to be derived from a pilot signal in the information signal.

5 Claims, 4 Drawing Figures

ELECTRICALLY CONTROLLED RADIAL MASS SHIFTING ELEMENTS FOR TURNTABLE SPEED REGULATION IN AN APPARATUS FOR READING DISC-SHAPED INFORMATION CARRIERS

The invention relates to an apparatus for reading disc-shaped information carriers provided with substantially circular tracks, in which information, in particular picture information, is stored in coded form, which information carriers are disposed on a turntable, a read unit supplying a control signal to a control device for maintaining the reading speed constant.

Such an apparatus in the form of a video record player is known from German patent application 2,320,477 which has been laid open for public inspection. In said apparatus the track to be followed, which is provided with audio and/or video signals, is optically scanned via a tilting mirror. Said mirror is driven electro-magnetically by the control signal and it is known that said tracking system allows a very high accuracy to be obtained. However, the tilting mirror construction is highly susceptible to shocks, which would prohibit the use of such a system in a mass-produced video reconrd player.

It is an object of the invention to mitigate said drawback and the invention is characterized in that the control device comprises at least two mass elements which are connected to the turntable symmetrically relative to the axis of rotation of the turntable, resiliently in the radial direction and rigidly in the tangential direction, which elements are radially movable in response to the control signal.

As a result of the radial movement of the elements the moment of inertia of the turntable with the elements connected thereto is changed. Owing to the law of conservation of momentum the speed of rotation of the turntable changes as a consequence of this; transfer takes place immediately, any irregularity in the speed of rotation — (or rather) of the reading speed = speed of rotation at the location of the read unit — is corrected at once.

In an embodiment of the invention each element consists of an axially magnetized rod-shaped permanent magnet, which is attached to the turntable by at least one radially flexible leaf spring, a coil being disposed around each magnet, which coil is connected to the control signal.

The coil is disposed around the generally pinshaped magnet, whose magnet field is parallel to that of the magnet.

A deviation from the reading speed yields a control signal, so that the coil is energized and the magnet is given a radial deflection, which directly compensates for the deviation from the reading speed.

Another embodiment of the invention is characterized in that each element in an identical manner is secured to the edge of a metal disc via a connecting rod which disc is disposed centrally and loosely around the drive shaft of the turntable, while underneath the disc at least one electro-magnet is disposed, which magnetically co-operates with the disc and is connected to the control signal.

This yields the advantage that no sliding contacts need be used for the revolving turntable.

The apparatus according to the invention is furthermore provided with a measuring system, the control signal being derived from the difference in frequency between a pilot tone, which is contained in the information signal, and a standard frequency, which pilot tone is compared therewith at every instant.

Preferably the pilot tone consists of the line synchronization frequency in the case of video record players.

Figure 2:
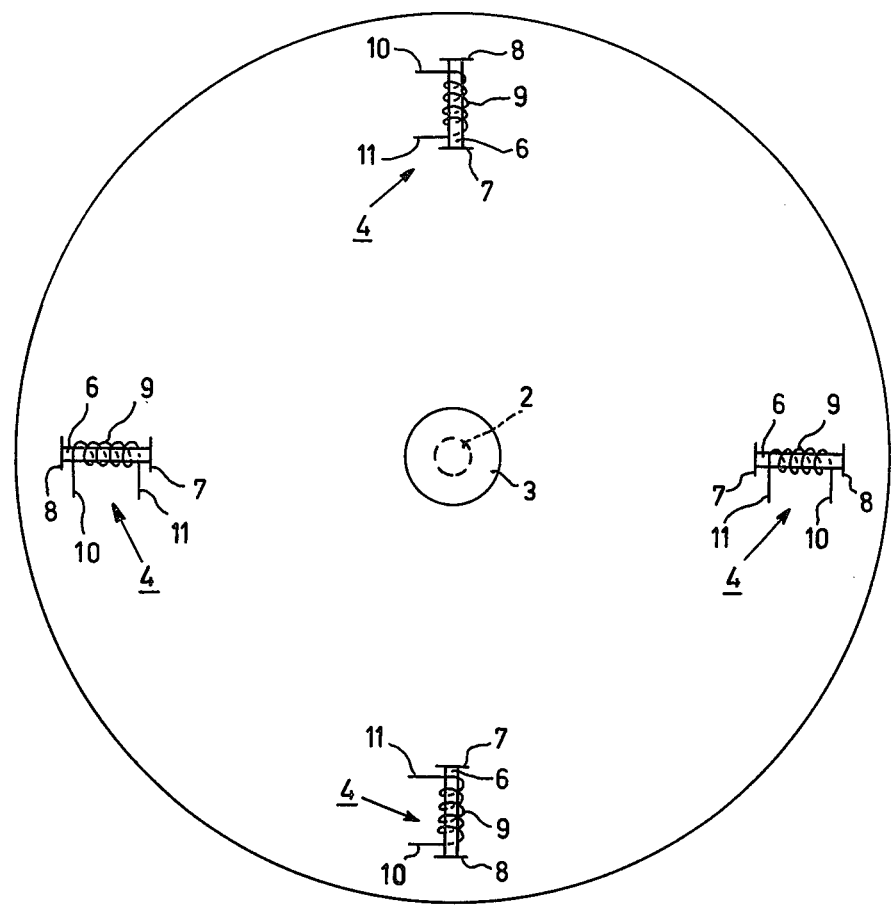
Figure 3:
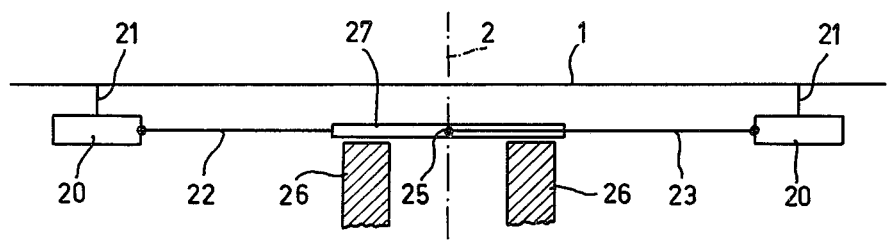
Figure 4:
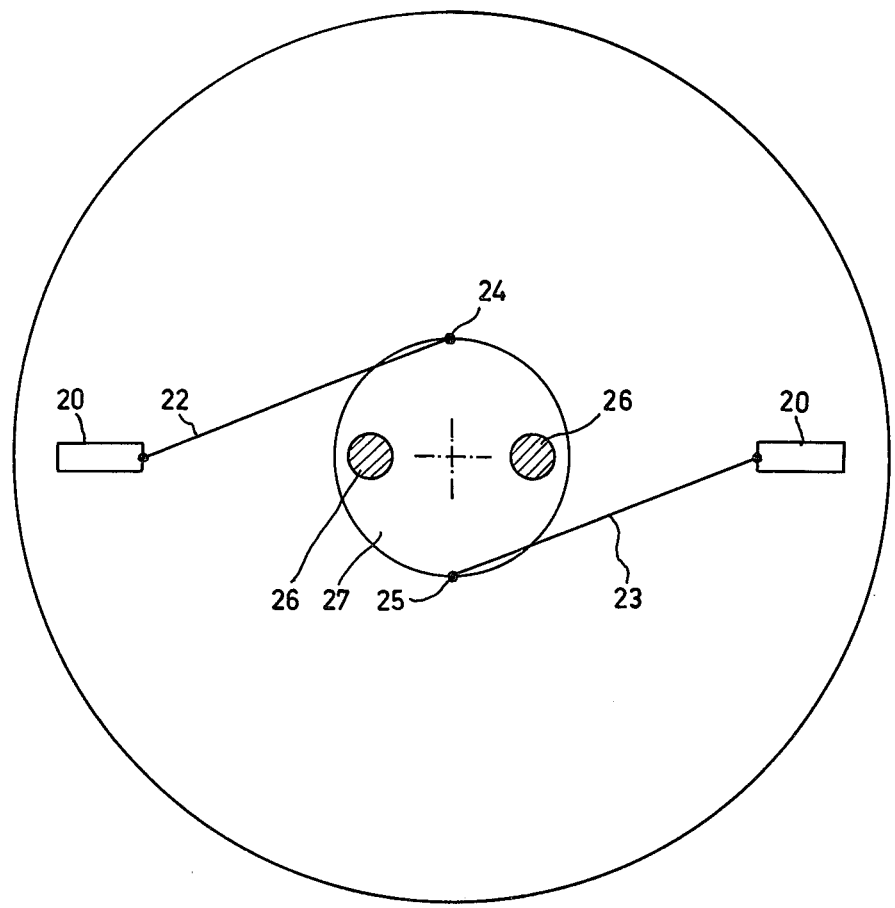

The invention will be described in more detail with reference to the drawing. In said drawing:

FIG. 1 is a cross-section and
FIG. 2 a bottom view of a turntable with compensation magnets,
FIG. 3 is a cross-section and
FIG. 4 a bottom view of a turntable comprising mass-elements connected to a loose disc.

FIGS. 1 and 2 schematically show a part of a video record player. Said part comprises a turntable 1 which via a shaft 2 is connected to a motor 3 and which turntable makes 1500 revolutions per minute during operation. Symmetrically relative to the axis of rotation 2 mass elements 4 are disposed at the underside 5 of turntable 1. Each mass element consists of a pin-shaped permanent magnet 6, which by its ends is clamped between two leaf springs 7 and 8. The magnet 6 is clear of the turntable 1 and is disposed radially. The magnet is axially magnetized and consists of an oxide-ceramic material which is marketed under the name Ferrodur. Around the magnet a coil 9 is disposed whose ends 10 and 11 are connected to a control signal. The leaf springs 7 and 8 are slack in the radial and stiff in the tangential direction. Each facing pair of mass elements 4 is symmetrical relative to the axis of rotation 2, i.e. the distance from the center of each mass element to the axis of rotation is the same. The coils are connected with a control signal of 25 Hz, which frequency corresponds to a speed of rotation of 1500 revolutions per minute = 25 revolutions per second.

FIGS. 3 and 4 schematically show an alternative correction system according to the invention. The mass elements in this case consist of two facing metal rods 20 which are radially attached to the turntable 1 by one leaf spring 21. By means of coupling rods 22 and 23 said rods 20 are attached to the edge of a disc 27. Said attachment is hinged at the circumference at the locations 24 and 25, opposite each other and substantially perpendicular to the connection line of the mass elements 20.

Disc 27 is loosely movable around shaft 2 and is made of copper. Underneath said disc two electro-magnets 26 are disposed vertically opposite each other. Said magnets are connected to the control signal.

When the electro-magnets receive a control signal, a vertical magnet field develops which via Foucault currents produced in the disc will exert a braking force on the disc. As the disc can rotate freely around the shaft, the speed thereof is influenced and the mass elements are thus moved so that the speed of the turntable is corrected.

What is claimed is:

1. An apparatus for reading disc-shaped information carriers which are provided with substantially circular tracks, in which information is stored in coded form, in particular picture information, comprising a turntable on which said information carriers are disposed, a read unit means for supplying a reading speed control signal, and a control device comprising at least two mass elements which are connected to the turntable symmetrically relative to the axis of rotation of the turntable, resiliently in the radial direction and rigidly in the tangential direction, and means for moving said elements radially in response to the control signal.

2. An apparatus as claimed in claim 1, wherein each element consists of an axially magnetized rod-shaped permanent magnet, which is attached to the turntable by at least one radially flexible leaf spring, a coil which is connected to the control signal being disposed around each magnet.

3. An apparatus as claimed in claim 1, wherein each element is identically secured to the edge of a metal disc via a connecting rod, which disc is disposed centrally and loosely around the drive shaft of the turntable, at least one electro-magnet being disposed underneath the disc, which magnet cooperates magnetically with the disc and is connected to the control signal.

4. An apparatus as claimed in claim 1, wherein the control signal is derived from the difference in frequency between a pilot tone, which is contained in the information signal, and a standard frequency, which pilot tone is compared therewith at every instant.

5. An apparatus as claimed in claim 4, wherein the pilot tone consists of the line synchronization frequency.

* * * * *